United States Patent [19]

Husa

[11] Patent Number: 4,643,443
[45] Date of Patent: Feb. 17, 1987

[54] TRAILER HITCH ASSEMBLY AND METHOD

[76] Inventor: Marlin V. Husa, Liberty, Nebr. 68381

[21] Appl. No.: 601,569

[22] Filed: Apr. 18, 1984

[51] Int. Cl.⁴ ............................................. B62D 53/06
[52] U.S. Cl. ............................ 280/491 R; 280/423 R; 280/511
[58] Field of Search ................... 280/423, 425 R, 511, 280/415 R, 415 B, 407, 491 R, 438 R

[56] References Cited

U.S. PATENT DOCUMENTS

| 3,164,398 | 1/1965 | Lugash | 280/491 R |
| 3,164,399 | 1/1965 | Lugash | 280/423 R |
| 3,336,050 | 8/1967 | Dale | 280/423 R |
| 4,088,339 | 5/1978 | Sagebiel | 280/423 R |

Primary Examiner—John J. Love
Assistant Examiner—Everett G. Diederiks, Jr.
Attorney, Agent, or Firm—William D. West

[57] ABSTRACT

A removable trailer hitch assembly for connecting a gooseneck trailer to a pickup truck is disclosed. The hitch assembly provides a base frame having a ball hitch mounted thereon and adapted to be positioned in the floor of the pickup truck box so the frame straddles both wheel wells and positions the ball hitch over the rear axle of the pickup truck. Two pairs of pivotable elongate members telescopingly attach to the base frame to frictionally engage the lower surface of the upper horizontal side rail caps of the pickup box. Biasing between and toward each side pair of side rail engaging members is provided to secure the hitch assembly in the pickup bed by making a positive frictional engagement with the box side rails. Upon the connection of the trailer to the hitch assembly the weight of the trailer and the fore and aft pull of the trailer further secure the hitch assembly to the pickup box. The hitch assembly is attached to the pickup box without the necessity for drilling, bolting or welding. A method of unhitching the trailer so as to leave the pickup box free and the hitch assembly attached to the trailer is also disclosed.

10 Claims, 4 Drawing Figures

TRAILER HITCH ASSEMBLY AND METHOD

BACKGROUND OF THE INVENTION

1. Field of the Invention

The invention relates to a trailer hitch assembly for connecting a gooseneck trailer to a pickup truck, and in particular to a readily removable friction engaging hitch assembly that is adapted to the box of a pickup truck without causing damage.

2. Discussion of the Technical Problems

The use of "gooseneck" or "fifth wheel" trailers has become quite common. It has been found that by having the pivotal hitch point of a trailer over the rear axle of the towing vehicle that far greater loads can be transported safely than was possible with conventional trailers having the hitch point behind the rear axle such as on the rear frame or bumper. Such a trailer is also more stable in a crosswind, has a better turning radius than a conventional trailer and "tracks" or trails much better even with the increased loads.

With expanded agricultural, industrial and recreational use of gooseneck and fifth wheel trailers, it has been discovered that the ideal towing vehicle is the pickup truck. A pickup truck allows convenient access to a hitch point over the rear axle and is of a more heavy-duty construction than a conventional automobile.

In order to connect a fifth wheel trailer to a pickup truck numerous hitches have been developed. The true "fifth wheel" hitch approximates a fifth wheel hitch for a semi-trailer commercial truck and is quite complicated. It uses a flat plate "wheel" which must be capable of tilting and have a wedge connection slot for coupling. Since the loads towed by a pickup truck are limited, other lighter and simpler fifth wheel hitches have been developed specifically for pickup trucks. One such hitch is found in U.S. Pat. No. 4,327,934 to Karnes. Others are described in U.S. Pat. No. 3,759,545 to McKethan and U.S. Pat. No. 3,811,706 to Tucker et al.

The gooseneck trailer hitch is also in common use and it is a natural for pickup trucks. It has most of the advantages of the fifth wheel trailer but is generally lighter, considerably simpler and differs from the fifth wheel hitch in that it uses a standard ball and socket. The ball generally is placed in the bed of the pickup truck and the socket is an intregal part of the trailer's vertically desending tongue. U.S. Pat. No. 3,790,188 to Johannes describes one such hitch as does U.S. Pat. No. 4,077,650 to Leach Jr., U.S. Pat. No. 3,788,673 to Gloege and U.S. Pat. No. 3,733,089 to Goecke et al.

Regardless of the type of hitch employed, the attachment of the hitch to the pickup truck remains a problem if the full utility of the pickup truck is to be enjoyed. Once a hitch is bolted or welded to the bed of one's pickup truck it usually remains there. The hitch interfers with normal loading.

While a relatively flat portion of a hitch may seem to not interfer with normal loading, such is not the case if one wants to use the pickup box for hauling grain, sand, or other loose material. U.S. Pat. No. 4,183,548 to Schneckloth describes a hitch that leaves a bolted relatively flat plate in the bed of the disconnected pickup.

In order to fully utilize the advantages of the gooseneck or fifth wheel trailer and a pickup truck it is necessary to be able to fully remove the pickup attachment portion of the hitch when not in use. The removal should be easily accomplished without the necessity of using tools. U.S. Pat. No. 4,088,339 to Sagebiel provides a removable hitch assembly that uses pickup mounted retaining brackets and a pair of locking pins. The pickup bed must be modified to use the Sagebiel hitch assembly.

The prior art fails to disclose a readily removable trailer hitch assembly that does not modify the pickup truck bed or require drilling bolting or welding. Of course, a modified pickup bed or box would tend to reduce the resale value of the truck and in that manner deprive the owner of its full utility. It also makes such a hitch difficult to switch from one truck to another.

Accordingly, a need exists for a trailer hitch assembly that is fully removable when not in use, is easily adapted to diferent pickup trucks, does not require modification of the truck bed and can be installed and removed without the use of tools. The instant invention is directed to these and other needs as will become apparent upon a careful reading of this specification.

SUMMARY OF THE INVENTION

The primary object of the invention is to provide a readily removable trailer hitch for the connection of a gooseneck or fifth wheel type trailer to a pickup truck in a manner that does not require the modification of either the trailer or the pickup truck. The invention is intended to be light in weight, easily adapted to other pickup trucks, low in maintenance, and safe in use.

In order to meet the primary purpose of the invention, a hitch assembly is provided that includes a base frame member having a ball hitch or other convenient hitch and movablly attached appendages which frictionally engage the pickup box to hold the hitch in the correct position.

The base frame is a rectangular structural truss but could be any type of flat frame. Even a single large flat plate would work since the purpose of the base frame is to hold the hitch (ball) in the correct position over the rear axle of the pickup truck and to transfer the weight of the trailer tongue to the truck's rear wheels. The weight of a large flat plate is not needed or even desirable so a base frame having a smaller flat hitch plate to hold the hitch and a pair of transverse and a pair of longitudinal members is provided. The base frame straddles the wheel wells of the pickup truck and lies flat against the floor of the pickup box. The base frame, by way of the longitudinal members adjacent to the wheel wells keeps the hitch centered so it will not shift from side to side.

The transverse members complete the base frame rigid truss structure by connecting the longitudinal members together with the hitch plate. The transverse members are provided with ends adapted to be pivotally connected to appendages which allow the base frame to be frictionally engaged to the pickup box.

With the side to side displacement controlled by the longitudinal members, the fore and aft displacement is controlled by the appendages that frictionally engage the lower surface of the upper horizontal longitudinal side rail caps of the pickup box. The engagement appendages are slightly longer than the height of the box from floor to rail caps. This length provides a wedging force when the base frame is forced fore or aft.

The engagement appendages are "L" shaped rigid members that pivot in the pivot ends of the transverse members. Thus as the base frame shifts rearward the rearmost pair of appendages pivot to apply a greater frictional force against the lower surface of the side rail caps. The same wedging force occurs when the base frame shifts foreward except that the foreward pair of appendages apply the force against the side rail caps.

In order to keep the pivotal appendages in the proper position a biasing force is provided by way of a bungee cord or spring attached between the upper ends of the frictional appendages which initially provides a frictional engagement with the side rail caps.

Some pickup truck boxes have rounded portions of the side walls or wheel wells which would prohibit the frame member or the lower portion of the pivoting appendages from lying flat in the bed. For that reason it is in the intended scope of this invention that different sized frame members and different shaped pivoting appendages are provided.

It was found that a satisfactory pivot could be obtained by using cylindrical pipe for the transverse members and cylindrical pipe having an outside diameter less than the inside diameter of the transverse members for the lower pivoting portion of the appendages. The appendages thus telescope into the ends of the transverse members and provide transverse adjustment. Since the side rail caps on the pickup box also have a downwardly depending lip, the appendages must be pivoted and telescopingly slid in order to be properly postioned. The telescoping relationship allows the entire hitch assembly to be easily removed by sliding the appendages into the transverse members and then using the trailer tongue raising mechanism to lift the hitch assemby for its removal.

These and other features and objects are attained according to the instant invention by providing a hitch assemby having a hitch point base frame adapted to lie in the bed of a pickup truck with pickup box engaging arms movably attached to the base frame. Various types of fifth wheel and gooseneck trailer hitches can be utilized and the hitch assemby is easily adapted to varying pickup box configurations.

BRIEF DESCRIPTION OF THE DRAWINGS

The advantages of this invention will become apparent upon consideration of the following detailed disclosure of the invention, especially when taken in conjunction with the accompanying drawings, wherein.

DESCRIPTION OF THE PREFERRED EMBODIMENT

Figure 1:
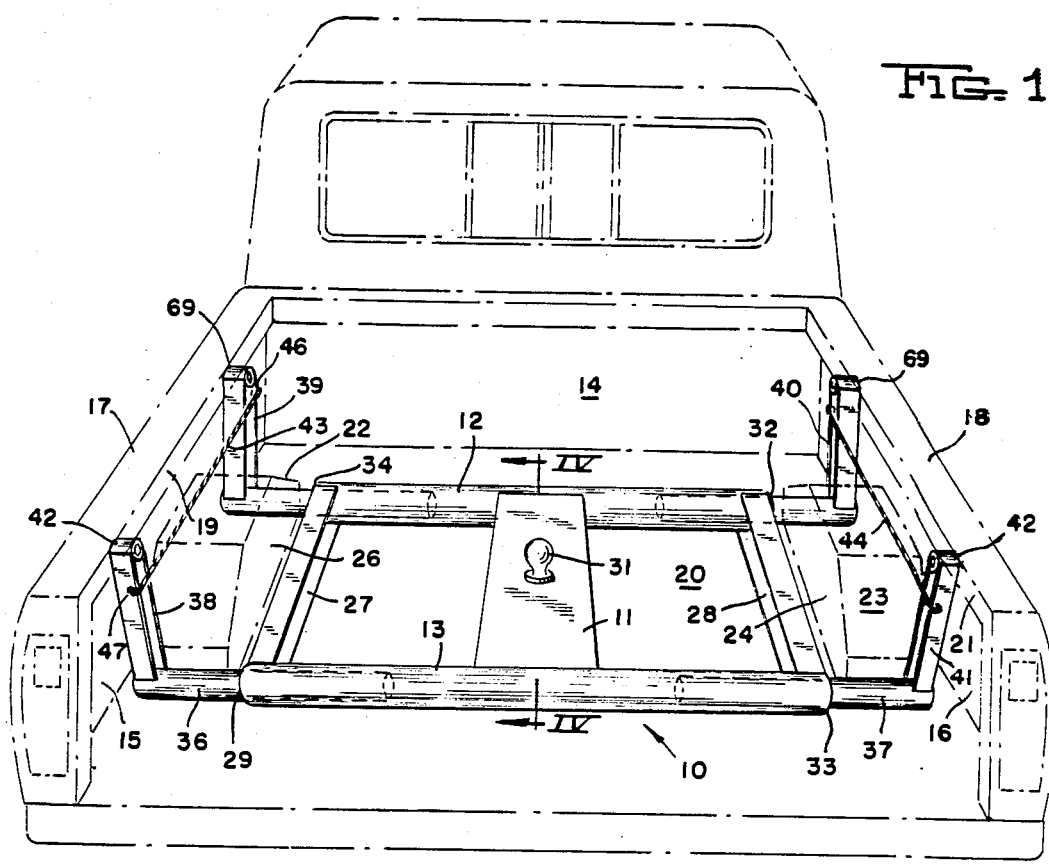
FIG. 1 is a perspective view of a preferred embodiment of the present invention in place in a pickup box shown in dashed outline.

The apparatus of the instant invention is depicted generally in FIG. 1. As can be seen by reference to FIG. 1, the hitch assembly apparatus is generally a rectangular base frame 10 made from hitch plate 11, a pair of transverse pipes 12 and 13 and a pair of longitudinal channels 27 and 28. Ball hitch 31 is bolted or welded to a point on hitch plate 11 that insures that ball hitch 31 is located directly over the rear axle of the pickup truck when base frame 10 is in place. Hitch plate 11 could be an inverted channel or "U" shaped member or a flat plate. The ends of hitch plate 11 are medially welded to a pair of transverse members 12 and 13 to form an "H" shaped structure. Transverse members 12 and 13 are depicted as cylindrical pipe in FIG. 1, however any rigid elongated structural member would suffice.

Transverse members 12 and 13 are slightly shorter than the distance between wheel well walls 24 and 26. Elongate arms 42, 69 joined to slidable elongate members 36 and 37 when inserted into transverse members 12 and 13 extend beyond and straddle wheel wells 22 and 23. To complete base frame 10 a pair of longitudinal members 27 and 28 are welded between the transverse members 12 and 13 so that when in place they lie adjacent to pickup truck wheel well walls 24 and 26.

FIG. 1 depicts longitudinal members 27 and 28 as channel or "U" shaped, however any rigid elongated structural member would sufice.

Figure 2:
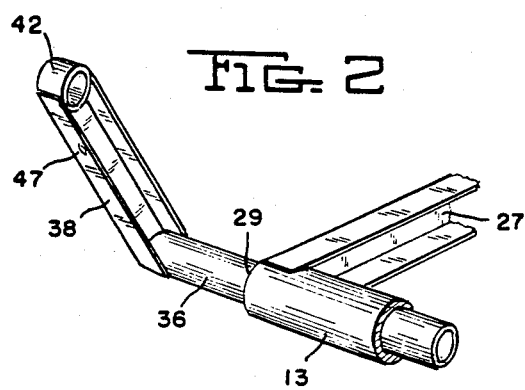
FIG. 2 is a perspective view of a side rail engaging member shown inserted in a cutaway pivot end of a transverse frame member.

Continuing with reference to FIG. 1, it can be seen that two pairs of side rail engaging members 42 and 69 are pivotally attached to transverse members 12 and 13. In the preferred embodiment shown in FIG. 1, the side rail engaging members such as side rail engaging member 42 or 69 are all similar in design. A more detailed depiction is shown in FIG. 2 of the side rail engaging members 42. As shown in FIG. 2, the side rail engaging members are "L" shaped members having a lower portion 36 and an upper portion 38. The two portions are welded together to form a rigid unit. In the first embodiment as shown in FIG. 2, upper portion 38 is a channel or "U" shaped member and lower portion 36 is a cylindrical pipe having an outside diameter less than the inside diameter of transverse member 12 or 13. It has been found that a two inch (5.08 cm) pipe will work quite well for lower portion 36 if transverse member 12 or 13 is a two and one half inch (6.35 cm) pipe. Lower portion 36 telescopes inside of transverse member 12 or 13 and if pipe is employed provide a pivotal attachment. End caps are welded to the channel 38 to complete the side rail engaging members 42. In order to provide a biasing force between side pairs of side rail engaging members such as side pairs 42 and 69 as shown on FIG. 1 a small biasing attachment hole 47 as depicted in FIG. 2 is provided in upper portion 38. Spring 44 is attached to hole 47 in a side pair 42 and 69 to provide the biasing force.

Figure 3:
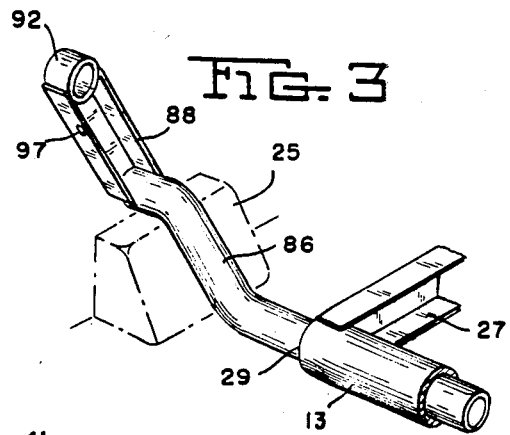
FIG. 3 is a partial perspective view of a second embodiment side rail engaging member shown inserted in the cutaway pivot end of a transverse frame member.

FIG. 3 depicts a second embodiment of the invention in that the side rail engaging member 92 depicted is provided with a shaped or bend lower portion 86 which sides and pivots into transverse member 12 or 13. The lower portion 86 is bent to allow clearence around certain obstructions in the pickup bed such as rounded portions for gas filler tubes and the like when in place. As can be noted, the upper portion 88 in FIG. 3 is shorter than the upper portion 38 in FIG. 2, otherwise upper portion 88 is similailry constructed.

Figure 4:
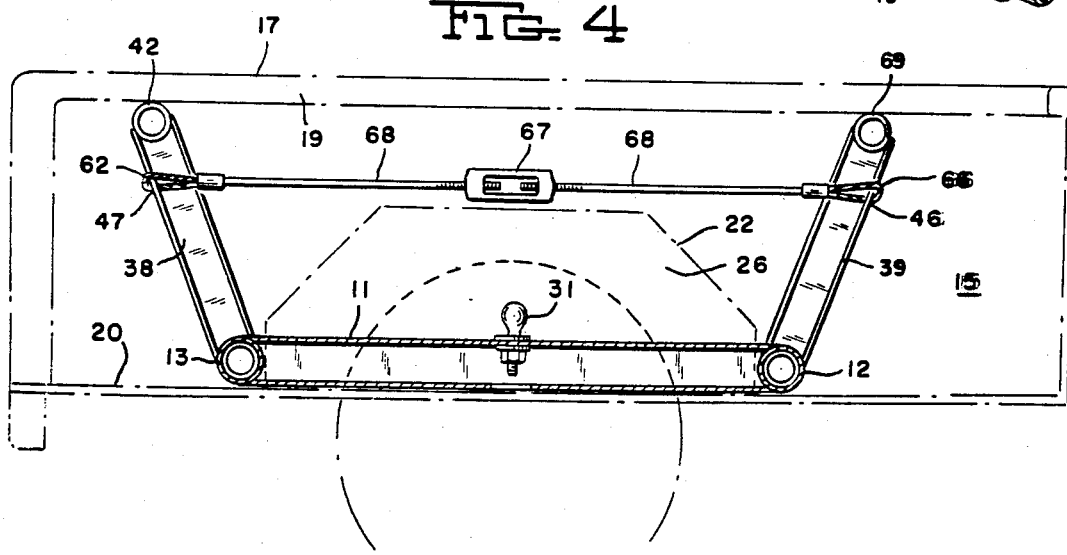
FIG. 4 is a left side elevational cutaway view of the hitch assembly of FIG. 1 taken generally along lines IV—IV in FIG. 1.

Referring now to FIGS. 1 and 4 where it can be seen that the hitch assembly of the invention includes a biasing structure such as a spring, bungee cord 43, a strap with a friction lock or tightening turnbuckle 67. The biasing structure provides a force between the upper portions 38 and 39 of the side rail engaging members which tends to pull the topmost surfaces 42 and 69 together as shown in FIG. 4. The other side rail engaging members 42 and 69 are also provided with biasing 44 as shown in FIG. 1. In the preferred embodiment, the biasing structure is attached to upper portions 38 and 39 by way of holes 46 and 47 in a manner well known in the art. Hooks 62 and 66 are on either end of the biasing structure and fit within holes 46 and 47. Any type of locking mechanism such as a clip (not shown) could be used to further secure the biasing structure to the rail engaging members. If a turnbuckle 67 or other tighnening structure is used, it too could be further secured.

With reference to FIGS. 1 and 4, the installation, use and removal of the hitch assembly will now be explained. As can be readily understood, the hitch assembly of the invention can be broken down into its component parts. The welded base frame 10 is separate from the two pairs of side rail engaging members and bungee cord and clips.

The modern pickup truck is manufactured with a molded or sculptured bed having a front upstanding wall 14 and a pair of parallel upstanding side walls 15 and 16. The tail gate (not shown) may be removed or left in place depending on the type of trailer used and whether the trailer tongue would clear the tail gate if left in place. The pickup box, therefore has a front wall 14, two side walls 15 and 16, a tail gate (not shown) and the floor 20. The floor 20 of the pickup truck also contains a pair of molded wheel wells 22 and 23 which have vertical walls 26 and 24 respectively. Side walls 15 and 16 are capped with horizontal side rails 17 and 18 which are molded portions of the side wall metal. A lip 19 and 21 is provided on many pickup boxes to strenghten the side wall and side rail combination. As can be seen in FIG. 3 some pickup truck beds also have assorted molded bumps 25 which provide for gasoline filler pipes and the like.

In order to use the hitch, the base frame 10 with ball hitch 31 secured is placed into the bed or floor 20 of a pickup truck box such as depicted in dashed outline in FIG. 1. Ball hitch 31 is located over the rear axle of the pickup truck as base frame 10 straddles wheel wells 22 and 23. By lifting rear transverse member 13 side rail engaging members lower portions 36 and 37 may be inserted into ends 29 and 33 of member 13 in a nesting or telescoping fashion. By the same procedure the forward side rail engaging members are telescopingly and pivotally attached to forward transverse member 12. Biasing structures 43 and 44 are attached by way of holes 46 and 47 to urge the topmost portions of side rail engaging members 42 and 69 against the lower surface of side rail 17. The topmost portion is rounded or made of pipe so that it will continuosly engage the lower surface of side rail 17. In a similar manner the other side rail engaging members 42 and 69 are biased together and urged against the lower surface of side rail 18. The hitch assembly is now in position for use and the trailer tongue can be attached. Any side to side motion is arrested by longitudinal members 27 and 28 acting against the wheel well walls 26 and 24. Fore and aft motion is resisted by the frictional engagement of the topmost surface of the side rail engaging members with the lower surface of the side rails. With more force tending to slide the base frame fore or aft the side rail engaging members tend to more tightly engage the side rails thus securing the hitch assembly to the pickup truck bed without the use of bolts or holes or welding.

In order to remove the hitch assembly, one could reverse the installation steps; however, it has been found that the trailer tongue can be used to assist in unhitching. In order to use the tongue removal method, the ball hitch is left connected to the socket in the tongue and the biasing structure is unhooked. The side rail engaging members are pivoted away from each other and slid into the ends of the transverse members so that the entire hitch assembly will clear the pickup box if it is lifted vertically or if the pickup truck is driven away. The trailer tongue is raised in a normal manner and the pickup is driven away. The hitch assembly remains attached to the trailer and the pickup bed is left uncluttered.

Although specific materials, dimensions, components, proportions and methods have been stated in the above description of the preferred embodiments of the invention, other suitable materials, proportions and process steps as listed herein may be used with satisfactory results and varying degrees of quality. In addition, it will be understood that various other changes in details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention as hereinafter claimed.

I claim:

1. A removable trailer hitch assembly for connecting a trailer to a pickup truck box, said box of the type having a floor, a pair of oppositely disposed wheel wells attached to said floor, a pair of vertical side walls attached to said floor and a pair of horizontal side rails attached to said respective side walls and extending inwardly therefrom, said hitch assembly comprising:

a base frame, having a front end and a rear end;

means for coupling a trailer to said base frame between said front end and said rear end of said base frame;

frictional engagement means movable connected to said base frame wherein said frictional engagement means comprises elongate arms, each having an upper and lower end wherein said upper end is adapted to frictionally engage a lower face of a respective one of said horizontal side rails of said pickup truck box and said lower end is moveably attached to said base frame; and biasing means for applying a biasing force to each said elongate arms urging said upper end of each arm against a respective lower face of a respective horizontal side rail of said pickup truck.

2. The hitch assembly as described in claim 1 wherein said elongate arms are pivotally attached to said base frame.

3. The hitch assembly as described in claim 2 wherein said elongate arms are slideably attached to said base frame.

4. The hitch assembly as described in claim 1 wherein said biasing means comprise a spring means attached between a side pair of upper elongate members.

5. The hitch assembly as described in claim 1 wherein said biasing means comprises a threaded rod attached between a side pair of upper elongate members.

6. The hitch assembly as described in claim 1 wherein said lower end of said lower end of each elongated arm is bent.

7. A removable trailer hitch assembly for connecting a trailer to a pickup truck box, said box of the type having a floor, a spaced pair of oppositely disposed wheel wells attached to said floor, a pair of vertical side walls attached to said floor, and a horizontal side rail attached to each of said side walls and extending inward therefrom, said hitch assembly comprising:

a base frame, having a front traverse elongate member, a rear traverse member, a pair of longitudinal side members, and a hitch plate;

means for coupling a trailer to said hitch plate between said front traverse member and said rear traverse member;

two pairs of elongated frictional engagement arms, each arm having an upper end and a lower end wherein said upper end is adapted to frictionally engage a lower face of a respective one of said horizontal side rails of said pickup truck box and said lower end is moveably attached to said base frame; and biasing means for applying a biasing force to each said elongate arms urging said upper end of each arm against a respective lower face of a respective horizontal side rail of said pickup truck.

8. The hitch assembly as described in claim 7 wherein said biasing means comprises a spring means attached between the upper ends of each elongate arm.

9. A method of unhitching a removeable trailer hitch assembly for connecting a trailer to a pickup truck box, said box of the type having a floor, a pair of oppositely disposed wheel wells attached to said floor, a pair of vertical side walls attached to said floor, and a horizontal side rail attached to each of said side walls and extending inward therefrom wherein said hitch assembly includes: a base frame, having a front end and a rear end; means for coupling a trailer to said base frame between said front end and said rear end of said base frame; and frictional engagement means being moveably connected to said base frame wherein said frictional engagement means comprises elongate arms, each arm having an upper and a lower end wherein each said upper end is adapted to frictionally engage a lower face of a respective one of said rails of said pickup truck box and each of said lower end is moveably attached to said base frame; biasing means for applying a biasing force to each said elongate arms urging said upper end of each arm against a lower face of a respective said horizontal side rail of said pickup truck, the method comprising:

disengaging said biasing means;

disengaging said frictional engagement means from said horizontal side rails;

moving said frictional engagement means beyond said wheel wells toward said base frame;

stabilizing said trailer in vertical displacement; and moving said pickup truck box.

10. A method of unhitching a removeable trailer hitch assembly for connecting a trailer to a pickup truck box, said box of the type having a floor, a pair of oppositely disposed wheel wells attached to said floor, a pair of vertical side walls attached to said floor, and a horizontal side rail attached to each of said side walls and extending inward therefrom wherein said hitch assembly includes: a base frame, having a front end and a rear end; means for coupling a trailer to said base frame between said front end and said rear end of said base frame; and frictional engagement means being moveably connected to said base frame wherein said frictional engagement means comprises elongate arms, each arm having an upper and a lower end wherein each said upper end is adapted to frictionally engage a lower face of a respective one of said horizontal side rails of said pickup truck box and each of said lower end is moveably attached to said base frame; biasing means for applying a biasing force to each said elongate arms urging said upper end of each arm against a lower face of a respective said horizontal side rail of said pickup truck, the method comprising:

disengaging said biasing means;

disengaging said frictional engagement means from said horizontal side rails;

moving said frictional engagement means beyond said lower face toward said base frame;

raising said trailer in vertical displacement such that said base frame is elevated above said wheel wells; and moving said pickup truck box.

* * * * *